US009077721B2

(12) United States Patent
Przybysz et al.

(10) Patent No.: US 9,077,721 B2
(45) Date of Patent: Jul. 7, 2015

(54) METHODS AND APPARATUS FOR REGISTERING OR DEREGISTERING A USER TO OR FROM AN IP MULTIMEDIA SUBSYSTEM

(75) Inventors: Hubert Przybysz, Hägersten (SE); Stephen Terrill, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1504 days.

(21) Appl. No.: 12/293,164

(22) PCT Filed: Mar. 21, 2006

(86) PCT No.: PCT/EP2006/060928
§ 371 (c)(1),
(2), (4) Date: Mar. 6, 2009

(87) PCT Pub. No.: WO2007/107185
PCT Pub. Date: Sep. 27, 2007

(65) Prior Publication Data
US 2010/0008352 A1    Jan. 14, 2010

(51) Int. Cl.
*H04L 12/66* (2006.01)
*H04L 29/06* (2006.01)
*H04L 29/08* (2006.01)

(52) U.S. Cl.
CPC ........ *H04L 65/1016* (2013.01); *H04L 65/1073* (2013.01); *H04L 67/14* (2013.01); *H04L 67/147* (2013.01)

(58) Field of Classification Search
None
See application file for complete search history.

(56) References Cited

U.S. PATENT DOCUMENTS

| | | | |
|---|---|---|---|
| 8,036,211 B1* | 10/2011 | Leeder et al. | 370/353 |
| 8,473,617 B2* | 6/2013 | Bennett et al. | 709/227 |
| 2004/0068574 A1* | 4/2004 | Costa Requena et al. | 709/230 |
| 2005/0237931 A1* | 10/2005 | Punj et al. | 370/229 |

FOREIGN PATENT DOCUMENTS

WO    WO 2004/089023 A    10/2004

OTHER PUBLICATIONS

"Digital cellular telecommunications system (Phase 2+): Universal Mobile Telecommunications System (UMTS); IP Multimedia Subsystem (IMS); Stage 2 (3GPP TS 23.228 version 7.2.0 Release 7); ETSI TS 123 228" ETSI Standards, European Telecommunications Standards Institute, Sophia-Antipo, FR, vol. 3-SA2, No. V720, Dec. 2005, pp. 1-194, XP014032467 ISSN: 0000-0001 Paragraph [4.2.4.] paragraph [4.2.4b.]; figure 4.3B.
Rosenberg J et al; "SIP: Session Initiation Protocol" IETF Standard, Internet Engineering Task Force, IETF, CH, Jun. 2002, pp. 1-269, XP015009039 ISSN: 0000-0003 Paragraph [10.2.].
ETSI TS 123 002 v7.0.0 Digital Cellular Telecommunications System (Phase 2+); UMTS; Network Architecture (3GPP TS 23.002 v7.0.0 Release 7).

* cited by examiner

*Primary Examiner* — Robert C Scheibel

(57) ABSTRACT

A method of registering or deregistering a user to or from an IP Multimedia Subsystem (IMS) network. A SIP Application Server (SIP-AS) performs a registration or deregistration with the IMS network on a user's behalf. The registration or deregistration is performed over one of the following interfaces: a Service Control Interface (ISC) with a Serving Call State Control Function (S-CSCF), a Gm interface with a Proxy CSCF (P-CSCF), or an Ma interface with an Interrogating CSCF (I-CSCF).

12 Claims, 9 Drawing Sheets

METHODS AND APPARATUS FOR REGISTERING OR DEREGISTERING A USER TO OR FROM AN IP MULTIMEDIA SUBSYSTEM

TECHNICAL FIELD

The present invention relates to user registration in the IP Multimedia Subsystem.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalized, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7. IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically the IMS architecture according to 3GPP Release 5 (R5) and IMS Release 6 (R6). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, application servers (ASs) are provided for implementing IMS service functionality. Whilst it was originally envisaged that ASs would operate as "slaves" to the IMS CSCFs, responding to requests delegated by the S-CSCFs, this need not be the case and indeed it is now expected that ASs may have interfaces to external (i.e. non-3GPP) networks, and may receive an internal stimulus to perform an action (e.g. a timer expiry). FIG. 2 illustrates the IMS Service Control (ISC) interface between an AS and an S-CSCF, as well as other interfaces within the IMS. Although the AS in FIG. 2 is shown as having only a single interface to an S-CSCF it will be appreciated that in practice the ISC interface will extend across a communication network to which many (or all) of the CSCF servers of a given operator's network are connected, allowing an AS to communicate with all of these CSCFs. [Other entities illustrated in FIG. 1 will be well known to those of skill in the art.]

User services in this architecture are invoked by linking in Application Servers on the ISC interface for originating and terminating requests based on filter criteria that are provisioned for the user in the HSS and executed in the S-CSCF upon request. In 3GPP IMS an Application Server can assume different roles with respect to service delivery and interaction with the S-CSCF. Example roles are shown in FIGS. 4 to 7, which show respectively: Application Server acting as terminating UA, or redirect server; Application Server acting as originating UA; Application Server acting as a SIP proxy; and Application Server performing third party call control.

A further interface (Ut) exists between the AS and the user terminal (TS23.002) although this is not shown in the Figure. The Ut interface enables the user to manage information related to his or her services, e.g. creation and assignment of Public Service Identities, management of authorization policies that are used for example by "presence" services, conference policy management, etc.

The current IMS architecture allows for an AS to initiate an IMS session in response to the receipt by the AS of an appropriate request over an external interface. One might for example envisage that an IMS session request is sent to the AS over an HTTP interface, where a user initiates the sending of a request by accessing a web page on the Internet. In this case, upon receipt of the session request, the AS will first contact a Home Subscriber Server (HSS) of the initiating user to determine whether or not the user is already registered with the IMS. The AS sends to the HSS a SIP identity generated for the user and which the HSS can use to determine whether or not the user is registered. If so, the HSS will send to the AS the identity of the S-CSCF already allocated to the user. The AS will then forward a SIP INVITE to the identified S-CSCF, and the session set-up procedure will continue as illustrated in FIG. 3. An example scenario where this situation might arise is where a 3GPP mobile subscriber is registered with the IMS, and the subscriber then logs on, via a home PC, to a web page and requests an IMS session via that channel.

If it is the case that the user is not registered already with the IMS, and this is reported to the AS by the HSS, the request cannot be processed. TS.228 specifically states that "If the AS could not acquire a S-CSCF address for the Public User Identity, the AS shall not initiate a session on behalf of the user". It will be appreciated that a similar problem arises where the stimulus for establishing an IMS session is generated internally, within the AS. For example, one can envisage a scenario where the AS has been requested to perform an update of a user's status on a presence server at a requested time. As in the case of an externally originating service, the current standards will allow the AS to initiate the require IMS session only if the user in question is registered with the IMS.

Whilst the discussion above relates to a user that is assumed to be a user possessing a public user identity, the user may be an application, i.e. possessing a public service identity.

SUMMARY OF THE INVENTION

As will be appreciated from the preceding discussion, a user can access the services of the IMS, via an AS, without necessarily being registered with the IMS. Even if the user is pre-registered, the actual contact address for the user at the AS will not be one that is registered with the IMS. However, registration of a contact address with the IMS allows the user to make use of certain user and subscription profiles predefined for the user within the IMS. When accessing the IMS via an AS, these profiles will not be available. This is a disadvantages of the conventional procedures.

According to a first aspect of the present invention there is provided a method of registering or deregistering a user to or from an IP Multimedia Subsystem network, the method comprising performing a Session Initiation Protocol registration or deregistration on the user's behalf by a Session Initiation Protocol Application Server.

The Session Initiation Protocol registration or deregistration may be performed over one of the following interfaces: over the Service Control Interface (ISC) with the Serving Call State Control Function;
over the Gm interface with the Proxy Call State Control Function; or
over the Ma interface with the Interrogating Call State Control Function.

Registration or deregistration is preferably initiated by the Application Server sending a SIP REGISTER method to the chosen Call State Control Function. The REGISTER method contains the following information: a UA-AS [where the term UA-AS designates the AS that registers in IMS] address/name, the Public User Identity and Private User Identity of the user on whose behalf the Application Server is acting, and a UA-AS network identifier.

The procedure for registering or deregistering a user comprises registering or deregistering one or more contact addresses for the user. A contact address may be an address of the Application Server [denoted above as the UA-AS address/name], or an address of another entity, e.g. another Application Server or User Equipment.

Where the method is used to register a user to an IP Multimedia Subsystem network, the method preferably comprises registering the capabilities of the Session Initiation Protocol Application Server acting as Session Initiation Protocol User Agent.

According to a second aspect of the present invention there is provided a method of operating a Session Initiation Protocol Application Server within an IP Multimedia Subsystem network, the method comprising exchanging Session Initiation Protocol signalling with a Call State Control Function in order to register or deregister an IP Multimedia Subsystem user.

According to a third aspect of the present invention there is provided a Session Initiation Protocol Application Server for use in an IP Multimedia Subsystem network, the Application Server comprising means for exchanging Session Initiation Protocol signalling with a Call State Control Function in order to register or deregister an IP Multimedia Subsystem user.

BRIEF DESCRIPTION OF THE DRAWINGS

FIG. 11 is a signalling flow associated with an S-CSCF selection procedure carried out by the UA-AS;

DETAILED DESCRIPTION

It is expected that users will wish to access services of an IP Multimedia Subsystem (IMS) network via access networks other that a SIP based access network. For example, a user may wish to make use of a circuit-switched access network, or a web-based access network. In such cases, the user will interface with the IMS via a Session Initiation Protocol Application Server (SIP AS). According to the current state of the 3GPP/IMS architecture however, a SIP AS cannot act as a SIP User Agent on behalf of a user as a registered contact. A SIP AS is therefore not able to terminate requests in the same way as can standard User Equipment (UE). An Application Server cannot register a contact on behalf of a user. A consequence of this is that an Application Server that wants to offer a user access to IMS services via some interface other than SIP, cannot perform functions that would otherwise require the user to be registered or would be invoked only if the user were registered with the IMS. Furthermore, an Application Server cannot deregister a contact address, or express its capabilities to the IMS, on behalf of a user.

Figure 8:
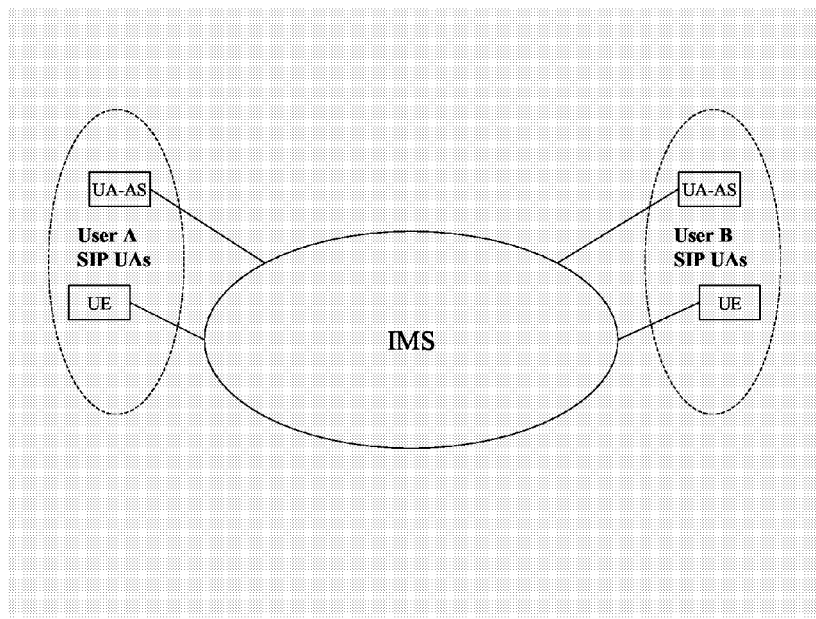
FIG. 8 illustrates schematically the operation of an Application Server as an AS-UA within the IMS.

It is proposed here to provide mechanisms which enable an Application Server to perform registration, re-registration, and de-registration procedures in the IMS, in order to allow the Application Server to act as a SIP User Agent for a user. This will allow, for example, an Application Server to register its own contact address for a user in the IMS, and in this way starts acting as a SIP User Agent for the user on a par with other SIP User Agents (if any) registered for the user. Once the AS assumes the role of a registered SIP UA for the user it may originate and terminate SIP traffic through the IMS (just like a UE). An Application Server that assumes the role of a SIP User Agent is referred to here as a UA-AS. FIG. 8 illustrates schematically the role of the UA-AS.

The IMS will treat the registered UA-AS as any other valid registered SIP UA for the user and will use its normal existing (and future) routing mechanisms to deliver traffic to and from it. In the case where the UA-AS represents one of a plurality of contact addresses registered in the IMS, 3GPP/IMS can deal with this using the existing forking mechanisms (RFC 3261), so that an incoming SIP request addressed to a Public User Identity is proxied to multiple registered contact addresses. Just like a UE, the UA-AS may register its capabilities in the IMS as described for the UE in 3GPP TS 24.229 with reference to RFC 3840 regarding user agent capabilities and characteristics. When multiple contact addresses have been registered, the S-CSCF has mechanisms to forward the requests based on SIP user agent capabilities and characteristics described in RFC 3840, caller preferences described in RFC 3841 and SIP proxy forking mechanisms described in RFC 3261.

Figure 9:
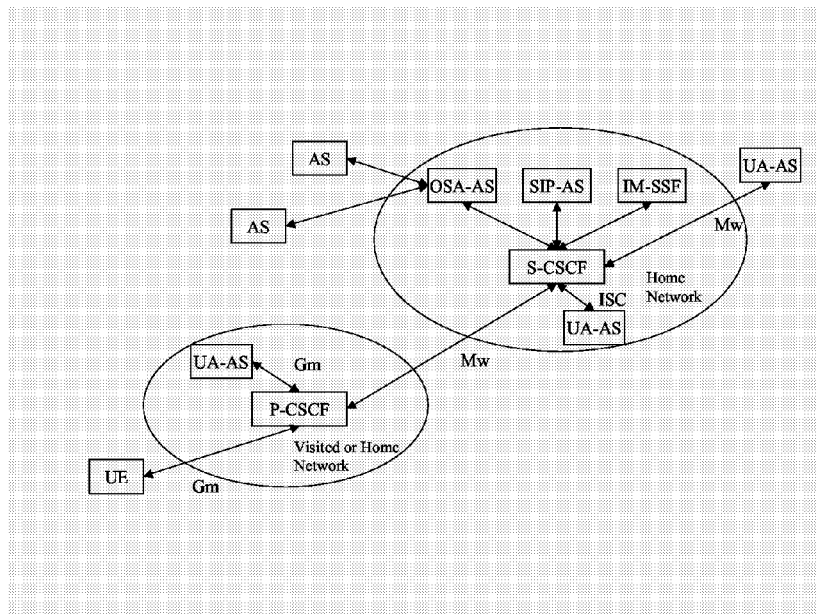
FIG. 9 illustrates schematically the various interfaces available for the UA-AS to register to the IMS.

An Application Server can register with the IMS, on behalf of a user, using one of the Call Session Control Functions of the IMS, namely, the P-CSCF, I-CSCF, or S-CSCF. In order to be able to register in the IMS, the UA-AS must establish a security association with the IMS. In order to establish such a security association with a P-CSCF in a visited or home network, the UA-AS must have knowledge of the user's authentication credentials as known to the UE. There are a number of mechanisms by which this could be achieved and these will be well known to the person of skill in the art. In order to establish a security association with an S-CSCF in the home network, the UA-AS can use the existing basic security mechanism available on the ISC (based on address filtering) in the case of a direct connection between the UA-AS and the S-CSCF, or it could use an enhanced security method, requiring that the UA-AS obtain a security token from the HSS and provide this to the S-CSCF. FIG. 9 illustrates these two alternative interfaces for registering with the IMS. [When the UA-AS registers with the IMS via an I-CSCF, the security association is established with the S-CSCF, with the I-CSCF acting merely as a transit node.]

The procedure described here allows a UA-AS to register multiple contacts for a given user, as well as supporting the use of multiple UA-ASs for the user. The procedure places no restrictions on the number of contacts or the number of UA-ASs for a user. The procedure makes it possible for a UA-AS to register and deregister a contact belonging to another SIP UA, providing of course that the required permissions are in place. No restrictions are placed on the functionality, capabilities and characteristics supported by the UA-AS. For example, the UA-AS may initiate and receive multimedia sessions, or it may be a presence source and/or watcher, etc. The UA-AS may act as a SIP Back-to-Back User Agent (B2BUA). Note that the procedure is applicable not only for IMS users identified with Public User Identities, but also for users identified with Public Service Identities.

The various alternative procedures by which the UA-AS can register with the IMS on behalf of a user will now be described in more detail.

UA-AS Registers Through P-CSCF

The UA-AS will follow the existing UE procedures specified in 3GPP TS 24.229 clause 5.1.1 for P-CSCF discovery, registration and authentication. The UA-AS may also use methods of 3GPP TR 23.981 in case of IPv4. The UA-AS performs these procedures on the Gm interface.

UA-AS Registers Through I-CSCF

Figure 10:
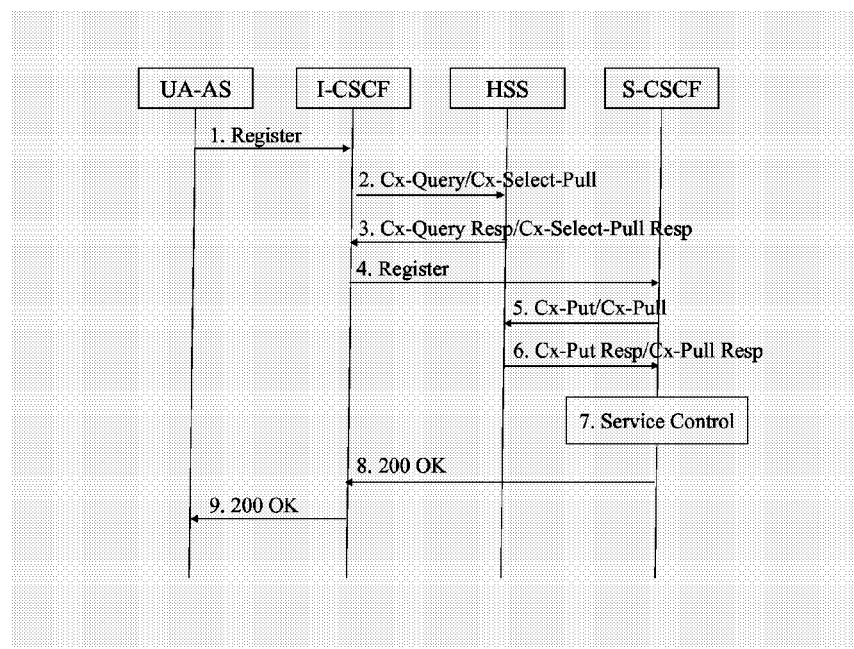
FIG. 10 is a signalling flow associated with registration of an AS-UA with the IMS via the I-CSCF.

The UA-AS will send a REGISTER message to the I-CSCF. The signalling sequence of FIG. 10 is followed, and applies when the user is either already registered or is unregistered. The signalling steps are as follows:

1. The UA-AS uses a provisioned "home domain name" to discover an I-CSCF. The UA-AS shall send the Register information flow to the I-CSCF, including the UA-AS address/name, Public User Identity, Private User Identity, and UA-AS network identifier. A name-address resolution mechanism is utilized in order to determine the address of the I-CSCF from the home domain name.

2. The I-CSCF shall send the Cx-Query/Cx-Select-Pull information flow to the HSS, containing the Public User Identity, Private User Identity, and UA-AS network identifier. The HSS shall check whether the user is registered already. As per existing procedures, the HSS shall indicate whether the user is allowed to register in the network that the UA-AS is in (identified by the network identifier), according to the User subscription and operator limitations/restrictions if any.

3. Cx-Query Resp/Cx-Select-Pull Resp is sent from the HSS to the I-CSCF. It shall contain the S-CSCF name if it is known by the HSS, or the S-CSCF capabilities if it is necessary to select a new S-CSCF. When only capabilities are returned, the I-CSCF shall perform the new S-CSCF selection function based on the capabilities returned. When the response contains both an S-CSCF name and capabilities, the I-CSCF may or may not perform a new assignment. [If the check performed by the HSS is not successful the Cx-Query Resp shall reject the registration attempt.]

4. The I-CSCF, using the name of the S-CSCF, shall determine the address of the S-CSCF through a name-address resolution mechanism. The I-CSCF also determines the name of a suitable home network contact point, possibly based on information received from the HSS. The I-CSCF shall then send the register information flow (P-CSCF address/name, Public User Identity, Private User Identity, P-CSCF network identifier, UA-AS address) to the selected S-CSCF. The S-CSCF shall store the UA-AS address/name, as supplied by the UA-AS. This represents the address/name that the home network uses to forward subsequent terminating session signalling to the UA-AS (in the same manner as if it was a conventional UE). The S-CSCF shall store the UA-AS network identifier information.

5. The S-CSCF shall send Cx-Put/Cx-Pull (Public User Identity, Private User Identity, S-CSCF name) to the HSS.

6. The HSS shall store the S-CSCF name for the user and return the information flow Cx-Put Resp/Cx-Pull Resp (user information) to the S-CSCF. The user information passed from the HSS to the S-CSCF shall include one or more names/addresses data which can be used to access the platform(s) used for service control while the user is registered at this S-CSCF.

7. The S-CSCF shall store the information for the indicated user. In addition to the names/addresses data, security information may also be sent for use within the S-CSCF. Based on the filter criteria, the S-CSCF shall send register information to the service control platform and perform whatever service control procedures are appropriate.

8. The S-CSCF shall return the 200 OK information flow (home network contact information) to the I-CSCF.

9. The I-CSCF shall send the 200 OK information flow (home network contact information) to the UA-AS. The I-CSCF shall release all registration information after sending this information flow. The UA-AS shall store the home network contact information.

It will be appreciated that this signalling flow is similar to that described in chapter 5.2.2.3 of TS 23.228, but in the present case, the UA-AS is registering on the Ma (I-CSCF to AS) interface. Also, for authentication purposes, the SIP-AS has for the present procedure another IMPU and authentication credentials, or it is a trusted node or trust is established by means of a security token.

Figure 1:
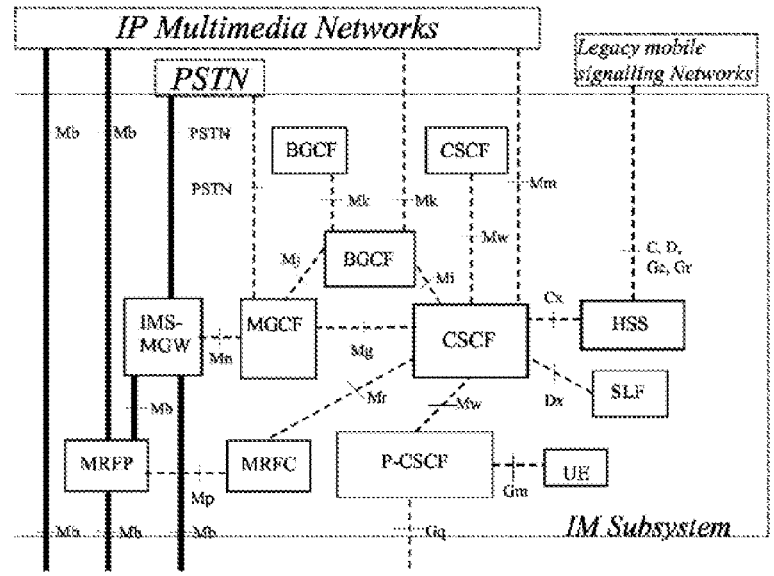
FIG. 1 illustrates schematically the configuration of entities within an IP Multimedia Subsystem.
Figure 2:
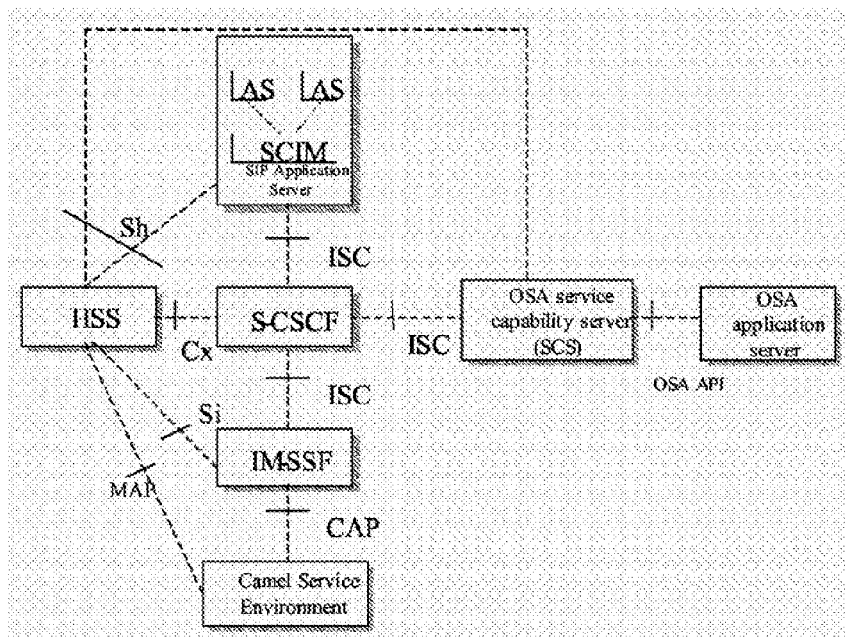
FIG. 2 illustrates the functional architecture for the provision of services within the IP Multimedia Subsystem.
Figure 3:
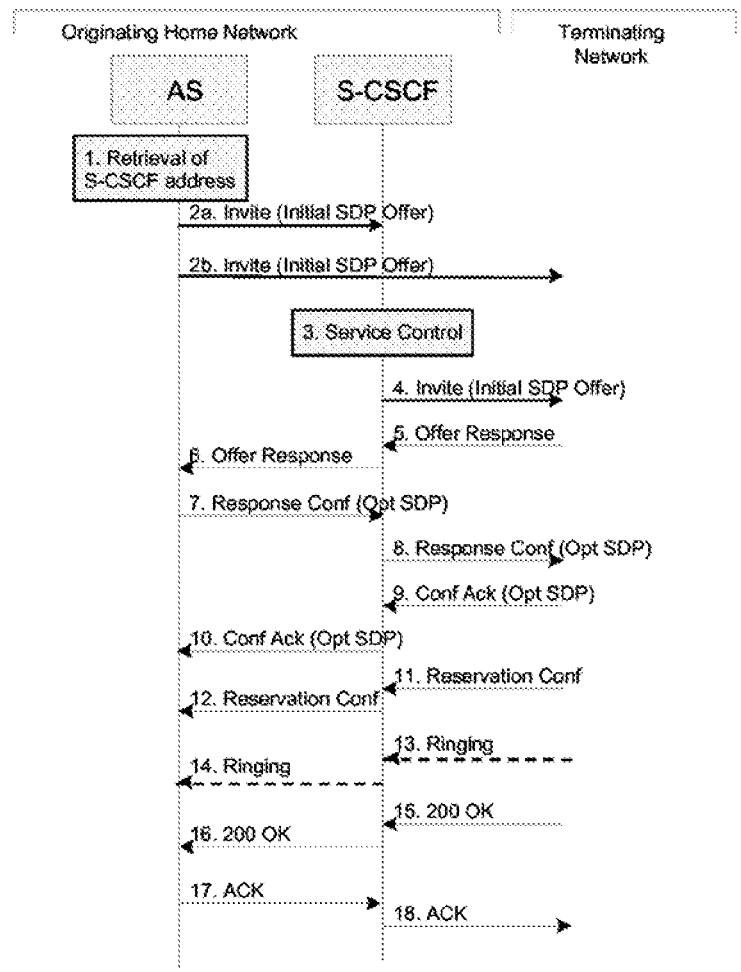
FIG. 3 shows an exchange of SIP signalling associated with an Application Server establishing a dialogue on behalf of a user.
Figure 4:
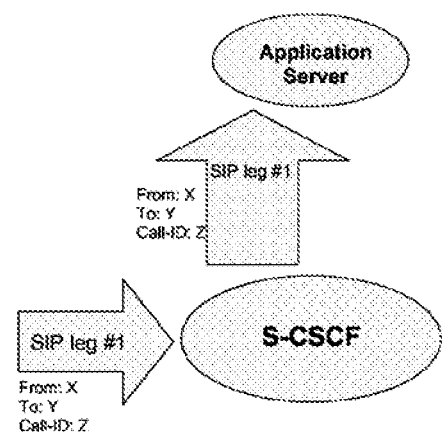
FIGS. 4 to 7 illustrate various roles performed by a SIP Application Server with respect to service delivery and interaction with the IP Multimedia Subsystem.
Figure 5:
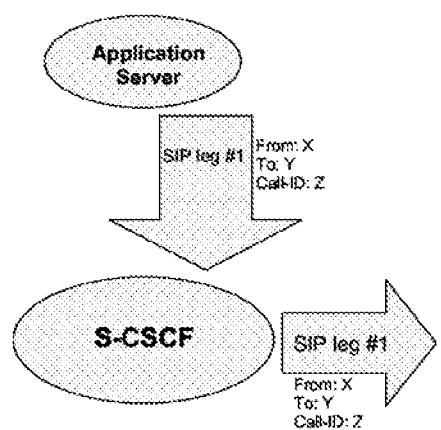
Figure 6:
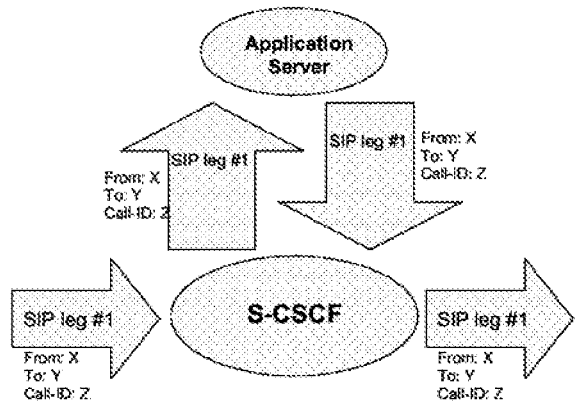
Figure 7:
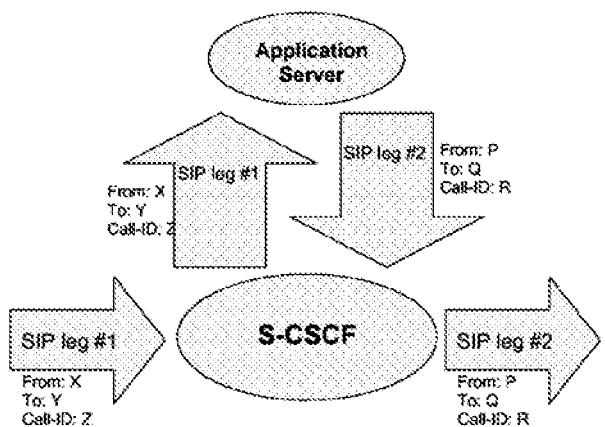
Figure 11:
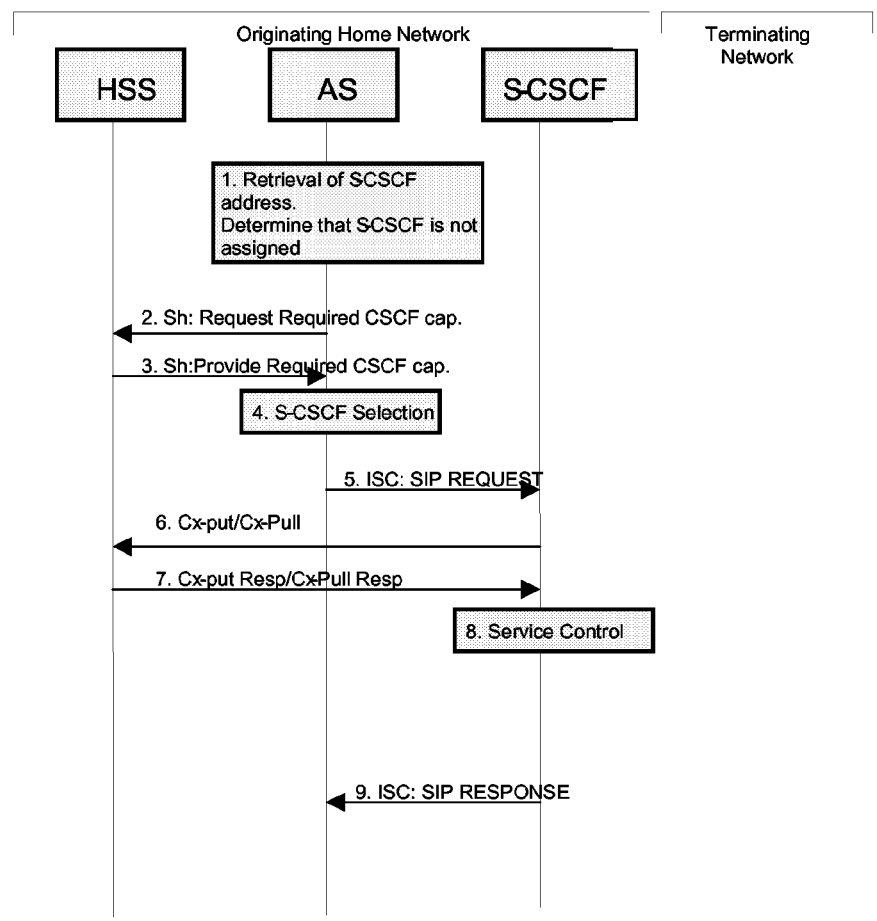

UA-AS Registers to S-CSCF

Where the UA-AS chooses to register directly with an S-CSCF in the user's home network, the UA-AS must determine whether or not an S-CSCF is already allocated to the user, and, if one has not been allocated, trigger an S-CSCF allocation process. There is an existing mechanism on the Sh interface (between the HSS and the AS) which the UA-AS can use to determine if an S-CSCF is allocated and, if allocated, to obtain the address of the allocated S-CSCF. In the event that an S-CSCF is not allocated, the UA-AS implements the following procedure, as illustrated in FIG. 11:

1. The UA-AS attempts to retrieve the S-CSCF address for the user by contacting the Home Subscriber Server (HSS) over the Sh interface (FIG. 2), sending a SIP identity of the user, generated on behalf of the user, to the HSS. The UA-AS determines that the user is unregistered and that an S-CSCF has not been allocated to the user.
2. The UA-AS requests the required S-CSCF capabilities from the HSS.
3. The HSS returns the required S-CSCF capabilities to the UA-AS over the Sh interface. This functionality is new, as currently S-CSCF capabilities can only be transferred over the Cx interface.
4. The UA-AS performs S-CSCF selection according to some predefined criteria, details of which are not relevant here. (Currently this functionality resides in the I-CSCF.)
5. The UA-AS generates a SIP request (e.g. a SIP REGISTER), including a user identity (e.g. sip:username@operator.com). The SIP request is sent to the selected S-CSCF over the ISC interface.
6. The S-CSCF retrieves the user profile from the HSS and informs the HSS that this is now the S-CSCF allocated to the user, whilst maintaining the user unregistered state in the HSS. The S-CSCF records the mapping between the allocated SIP identity and the IP address of the UA-AS.
7. The HSS returns the user profile to the S-CSCF. The subscriber profile may now include originating unregistered service profile information, as well as originating registered, terminating registered, and terminating unregistered service profile information.
8. The S-CSCF performs any service control based on the received user profile (e.g. linking to a further AS), and records the mapping between the allocated SIP identity and the address of the UA-AS. Service control may involve, for example, utilizing screening filters to control user access to IMS services.
9. The SIP response is forwarded to the UA-AS. This establishes the SIP session.

Figure 12:
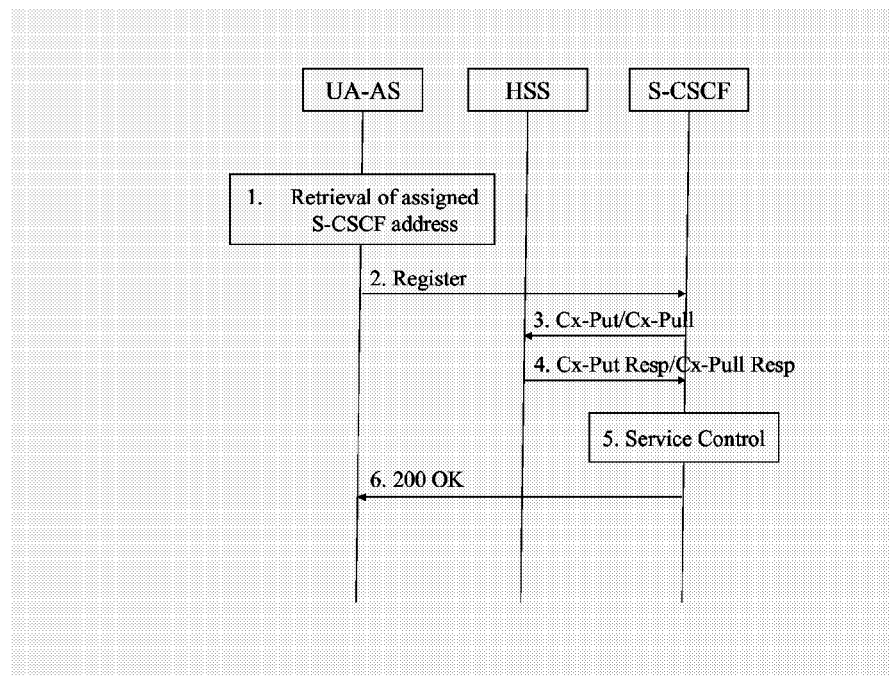
FIG. 12 is a signalling flow associated with registration of an AS-UA with the IMS via the S-CSCF.

Assuming that an S-CSCF is already allocated to the user, the procedure for registering via the S-CSCF follows the signalling flow illustrated in FIG. 12. The signalling steps are as follows:

1. The UA-AS retrieves the address of the S-CSCF assigned for the user. In this case there is an assigned S-CSCF following the procedure of FIG. 11.
2. The UA-AS shall send the Register information flow to the assigned S-CSCF, including the UA-AS address/name, Public User Identity, Private User Identity, and UA-AS network identifier. A name-address resolution mechanism is utilized in order to determine the address of the S-CSCF from the home domain name. The S-CSCF shall store the UA-AS address/name, as supplied by the UA-AS. This represents the address/name that the home network uses to forward the subsequent terminating session signalling to the UA-AS (in the same manner as if it was a UE). The S-CSCF shall store the UA-AS network identifier information.
3. The S-CSCF shall send the Cx-Put/Cx-Pull (Public User Identity, Private User Identity, S-CSCF name) to the HSS.

Note: Optionally as an optimization, the S-CSCF can detect if this is a re-registration and omit the Cx-Put/Cx-Pull request.

4. The HSS shall store the S-CSCF name for that user and return the information flow Cx-Put Resp/Cx-Pull-Resp (user information) to the S-CSCF. The S-CSCF shall store the user information for that indicated user.
5. Based on the filter criteria, the S-CSCF shall send register information to the service control platform and perform whatever service control procedures are appropriate.
6. The S-CSCF shall return the 200 OK information flow (home network contact information) to the I-CSCF. The UA-AS shall store the home network contact information.

Other procedures that may be carried out by the Application Sever acting as UA-AS include the following:

UA-AS Re-Registration Procedure

The re-registration procedure is similar to the registration procedure illustrated in FIG. 12 (where the user is registered and has an assigned S-CSCF).

UA-AS De-Registration Procedure

The UA-AS initiated de-registration procedure is again similar to the registration procedure of FIG. 12 (where the user is registered and has an assigned S-CSCF), with the exception that the UA-AS sends a new REGISTER message with an expiration value of zero seconds for the contact or contacts it wishes to de-register. A de-registration may result in the user being "completely" de-registered, and the assigned S-CSCF being released. Of course, if at least one other contact remains registered for the user, the S-CSCF will remain assigned. The S-CSCF may also remain assigned even if the user is completely de-registered, e.g. to continue to serve the user for "unregistered" services.

UA-AS Session Termination Procedure

Figure 13:
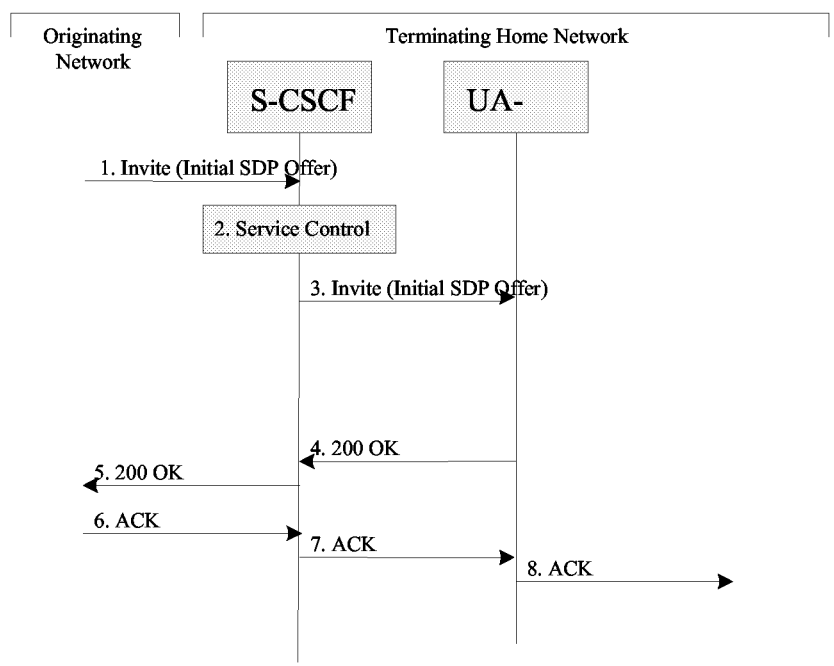
FIG. 13 is a signalling flow associated with an AS-UA termination procedure.

FIG. 13 shows a simplified signalling flow for a UA-AS terminating a SIP request on behalf of a UE. This is based on 5.7.2 of TS 23.228. Of course, all other possible signalling alternatives for normal SIP terminations can be handled by the UA-AS. The signalling steps are as follows:

1. The originating network sends the SIP INVITE request, containing an initial SDP (according to one of the origination procedures via one of the S-CSCF to S-CSCF procedures), to the Serving-CSCF for the terminating user.
2. The receiving S-CSCF validates the service profile, and invokes any termination service logic required for the user in question, including authorization of the requested SDP based on the user's subscription for multi-media services.
3. The S-CSCF remembers (from the registration procedure) the contact address for this UA-AS, and applies its normal routing procedures, including caller preferences and user agent capabilities based routing, resulting in the UA-AS being selected as the UA (or one of the UAs) to forward the request to. The S-CSCF forwards the INVITE to the UA-AS.
4-5. The UA-AS sends the 200-OK to S-CSCF, and the S-CSCF returns the 200-OK towards the session originating network.
6-8. The session originator responds to the 200-OK by sending the ACK message to S-CSCF via the S-CSCF to S-CSCF procedure, and the receiving S-CSCF forwards this to the terminating end along the signalling path.

It will be appreciated by the person of skill in the art that various modifications may be made to the above described embodiments without departing from the scope of the present invention.

The invention claimed is:

1. A method in a Session Initiation Protocol Application Server (SIP-AS) for registering a user to an IP Multimedia Subsystem (IMS) network, the method comprising:
   requesting by the SIP-AS, required Serving Call/Session Control Function (S-CSCF) capabilities from a Home Subscriber Server (HSS);
   receiving the required S-CSCF capabilities by the SIP-AS from the HSS over an Sh interface;
   performing S-CSCF selection by the SIP-AS according to predefined criteria, thereby eliminating the need for a separate Interrogating Call/Session Control Function (I-CSCF); and
   performing a SIP registration on the user's behalf by the SIP-AS so as to allow the SIP-AS to act as a SIP User Agent for the user, wherein the SIP-AS performs the registration over a Service Control Interface (ISC) directly with the selected S-CSCF, and wherein the registration enables the user to access user and subscription profiles defined for the user within the IMS network.

2. The method according to claim 1, wherein the step of performing the SIP registration includes initiating the registration by sending a SIP REGISTER message from the SIP-AS directly to the selected S-CSCF.

3. The method according to claim 1, wherein the SIP-AS sends directly to the selected S-CSCF, a SIP REGISTER message which includes a User Agent-Application Server (UA-AS) address/name, a Public User Identity and Private User Identity of the user, and a UA-AS network identifier.

4. The method according to claim 1, wherein the method comprises registering the capabilities of the SIP-AS acting as the SIP User Agent.

5. The method according to claim 1, wherein the SIP-AS acts as a Back-to-Back SIP User Agent.

6. The method according to claim 1, further comprising:
   performing a SIP deregistration on the user's behalf by the SIP-AS acting as the SIP User Agent for the user, wherein the SIP-AS performs the deregistration over the ISC directly with the selected S-CSCF.

7. The method according to claim 6, wherein the method comprises registering or deregistering one or more contact addresses for the user.

8. The method according to claim 7, wherein each of the one or more contract addresses is an address of the SIP-AS, and the method comprises registering or deregistering each of the one or more contract addresses of the SIP-AS for the user.

9. A method of operating a Session Initiation Protocol Application Server (SIP-AS) within an IP Multimedia Subsystem (IMS) network, the method comprising:
   requesting by the SIP-AS, required Serving Call/Session Control Function (S-CSCF) capabilities from a Home Subscriber Server (HSS);
   receiving the required S-CSCF capabilities by the SIP-AS from the HSS over an Sh interface;
   performing S-CSCF selection by the SIP-AS according to predefined criteria, thereby eliminating the need for a separate Interrogating Call/Session Control Function (I-CSCF); and
   exchanging SIP signaling over a Service Control Interface (ISC) directly with the selected S-CSCF in order to register an IMS user, wherein the SIP signaling is exchanged on the user's behalf by the SIP-AS acting as a SIP User Agent for the user, wherein registering the user enables the user to access user and subscription profiles defined for the user within the IMS network.

10. The method according to claim 9, further comprising:
    performing a SIP deregistration on the user's behalf by the SIP-AS acting as the SIP User Agent for the user, wherein the SIP-AS performs the deregistration over the ISC directly with the selected S-CSCF.

11. A Session Initiation Protocol Application Server (SIP-AS) for use in an IP Multimedia Subsystem (IMS) network, wherein the SIP-AS is configured to:
    request required Serving Call/Session Control Function (S-CSCF) capabilities from a Home Subscriber Server (HSS);
    receive the required S-CSCF capabilities from the HSS over an Sh interface;
    perform S-CSCF selection according to predefined criteria, thereby eliminating the need for a separate Interrogating Call/Session Control Function (I-CSCF); and
    exchange SIP signaling over a Service Control Interface (ISC) directly with the selected S-CSCF in order to register an IMS user, wherein the SIP-AS is configured to exchange the SIP signaling on the user's behalf while acting as a SIP User Agent for the user, wherein registering the user enables the user to access user and subscription profiles defined for the user within the IMS network.

12. The SIP-AS according to claim 11, wherein the SIP-AS is configured to:
    perform a SIP deregistration on the user's behalf by the SIP-AS acting as the SIP User Agent for the user, wherein the SIP-AS performs the deregistration over the ISC directly with the selected S-CSCF.

* * * * *